United States Patent [19]

Bidon

[11] Patent Number: 5,084,188
[45] Date of Patent: Jan. 28, 1992

[54] METHOD AND DEVICE FOR SEPARATION OF MATERIALS SUSPENDED OR DISSOLVED IN A LIQUID AND APPLICATION FIELDS

[75] Inventor: Daniel Bidon, Chateau-Thierry, France

[73] Assignee: M.A.T. Limited Company, Montmiral, France

[21] Appl. No.: 613,837

[22] PCT Filed: Mar. 27, 1990

[86] PCT No.: PCT/FR90/00205
§ 371 Date: Nov. 29, 1990
§ 102(e) Date: Nov. 29, 1990

[87] PCT Pub. No.: WO90/11113
PCT Pub. Date: Oct. 4, 1990

[30] Foreign Application Priority Data
Mar. 28, 1989 [FR] France .................. 89 04122

[51] Int. Cl.⁵ .................................. B01D 1/16
[52] U.S. Cl. .................................. 210/771; 159/4.01; 159/4.04; 159/48.1; 159/48.2; 210/774; 210/96.1; 210/103; 426/471
[58] Field of Search .................. 159/3, 4.4, 4.07, 4.01, 159/45, 48.1, DIG. 10, 11, DIG. 26, 39, 4.01, 4.04, 48.2, 48.1; 426/453, 471, 587, 588; 264/10; 137/487.5; 239/208, 209, 127, 280, 285; 210/771, 774, 96.1, 103

[56] References Cited

U.S. PATENT DOCUMENTS

| | | | |
|---|---|---|---|
| 1,866,769 | 7/1932 | Harris | 159/48.2 |
| 3,615,723 | 10/1971 | Meade | 159/48.1 |
| 4,287,901 | 9/1981 | Fowler | 239/208 |
| 4,292,121 | 9/1981 | Caffes | 159/48.1 |
| 4,323,424 | 4/1982 | Secunda et al. | 159/48.1 |
| 4,704,189 | 11/1987 | Assaf | 159/48.2 |

FOREIGN PATENT DOCUMENTS

| | | |
|---|---|---|
| 0033144 | 8/1981 | European Pat. Off. |
| 0097484 | 1/1984 | European Pat. Off. |
| 0250164 | 12/1987 | European Pat. Off. |
| 1230402 | 12/1966 | Fed. Rep. of Germany |
| 2308061 | 8/1974 | Fed. Rep. of Germany |
| 2355660 | 5/1978 | Fed. Rep. of Germany |
| 2925988 | 1/1980 | Fed. Rep. of Germany |

Primary Examiner—Robert A. Dawson
Assistant Examiner—Sun U. Kim
Attorney, Agent, or Firm—Pearne, Gordon, McCoy & Granger

[57] ABSTRACT

A method and device for separating materials suspended or dissolved in a liquid. The device includes a cross-beam (1), supported by masts (2) in which are fixed spraying heads (3) supplied by by-pass lines (13) from a conduit (4), sucking from a vat (5) through a filter (6) and a motor pump (7) and discharging into the vat (5) through a powered valve (8). The method includes the fine spraying of the fluid in an air flow in order to obtain the fine spraying of the quasi-instantaneous vaporization of liquid elements causing the precipitation by gravity of solid elements resulting from crystallization of dissolved materials or from the separation of suspended materials.

8 Claims, 1 Drawing Sheet

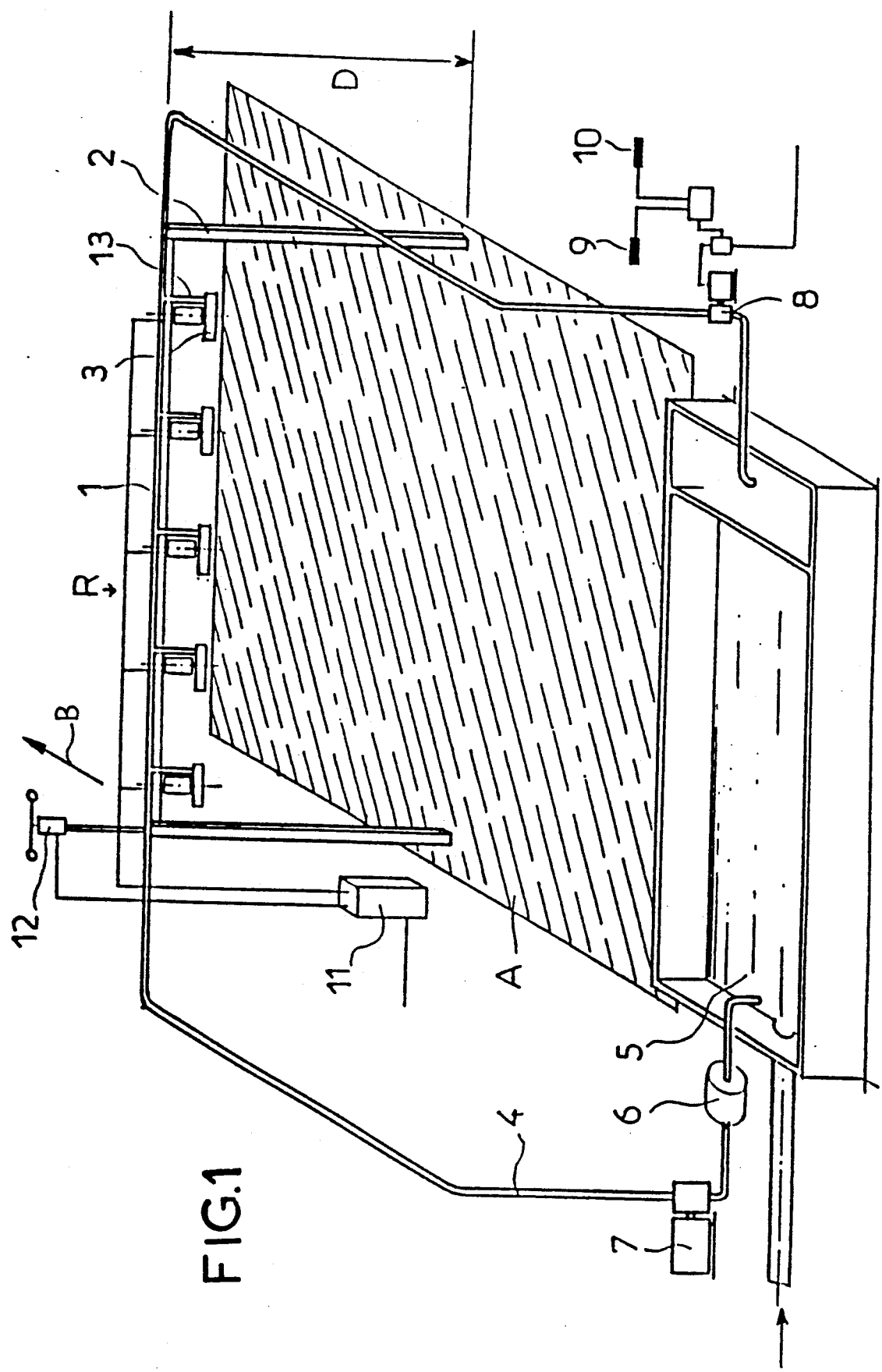

METHOD AND DEVICE FOR SEPARATION OF MATERIALS SUSPENDED OR DISSOLVED IN A LIQUID AND APPLICATION FIELDS

The invention concerns a process and a device for the separation of matter suspended or dissolved in a liquid and their fields of application.

Different procedures and means of separating matter contained in a liquid are already known, among which the mains ones are: decantation, evaporation, filtration and centrifuging.

Decantation and evaporation require rather large surface areas and call for rather slow physical processes that limit their capacity.

Filtration can be considered only for liquids that are not highly charged and do not cause the filters to clog too quickly, which translates into losses in charge, gradually reducing the flow and, consequently, the output of the equipment.

Centrifugin, which permits especially precise, selective separation of the particles, can be considered only for conversion of small volumes of specific fluids.

This invention is aimed at correcting these disadvantages by solving the problem of defining a process and creating a device for very precise, very complete separation of the liquid and solid elements forming a fluid on a very large flow area.

The process for separation of matter in suspension or solution in a liquid, according to the invention, consists of very finely spraying the fluid into an air flow, so as to obtain almost instantaneous vaporization of the liquid elements, thus causing precipitation by gravity of the solid elements resulting from the crystallization of the dissolved matter and separation of the matter in suspension, and their concentrations on a collection area located downstream from the sprayer in relation to the direction of the air flow.

The flow of fluid and the fineness of its spray are determined by the concentration of matter in suspension or in solution, depending on the pressure, temperature, hygrometry and speed of the air flow.

For a certain drop D between the spray gradient R and the collection area A, the size of the drops of liquid is regulated so that they evaporate completely before reaching the limits of the collection area A and before any of the solid phase falls onto it.

The gaseous phase of the liquid is condensed after reaching the limits of the collection area A.

The gaseous phase of the liquid is filtered before condensation S and the liquid is recycled after condensation.

For certain special fields of application, the liquid can be charged when it goes into the spray heads by using specific charges.

The device in the invention consists chiefly of a beam, supported by poles, to which are attached spray heads, constituting the gradient R, fed in closed circuit via branches on a conduit, drawing from a vat via a filter and a hand pump and discharging into the same vat via a motorized valve, where the collection area A for the solid phase of the charged liquid is placed perpendicularly to the spray gradient R.

The motorized valve or the flow of the motorized pump is controlled by two sensors measuring the temperature and the hygrometry of the air, respectively.

The motors driving the spray heads, constituting the gradient R, are powered with electrical energy by a converter controlled by an anemometric sensor located in the air flow.

According to one particular version of the device in the invention, the collection area A overhangs a conveyor belt for mechanically moving the collection to a processing place.

According to yet another version, the conveyor belt, covered by the collection area A, transports one layer of a product at the surface of which the solid phase of the charged liquid is deposited continuously.

The advantages derived from this invention basically consist of the fact that it makes it possible to vaporize any charged fluid with dissolved or suspended matter, whose gasification and solidification are compatible with the environment, and to recycle selectively liquid and solid components contained in a fluid or to deposit the charge on a surface that is continuously moving.

Other characteristics and advantages will appear in the following description of one version of the invention designed for purification of waste water, given as a nonlimiting example and using the appended drawing to show a schematic view in perspective of the installation.

The purification installation in the invention consists mainly of a beam 1 supported by posts 2, to which are attached spray heads 3, fed in a closed circuit via a conduit 4 drawing from a vat 5 using a filter 6 and a motorized pump 7 and discharging into the same vat 5, using a motorized valve 8, controlled by two sensors 9 and 10 that measure the temperature and hygrometry of the air, respectively. The motors driving the spray heads 3 are powered with electrical energy by a converter 11, controlled by an anemometric sensor 12.

In examining the scheme shown in the drawing in greater detail, one can see that in this example related to the treatment of waste water, the charged water contained in the vat 5 is drawn in by the motorized pump 7 through a filter 6 and is discharged into a conduit 4 whose return flow to the vat 5 is controlled by a motorized valve 8 or by the motorized pump 7 itself, to the extent that the latter is designed to provide a variable flow.

Mounted on the conduit 4 are branches 13, which feed the spray heads 3 that make up the gradient R with a charged liquid. The optimum separation conditions are obtained on the basis of the physical features of the environment via sensors measuring the temperature, hygrometry and air flow across the collection area A (see direction arrow B); and by automatic control of the flow of liquid in the conduit 4, temperature, hygrometry, air flow, and the rotation speed of the turning nozzles of the spray heads at in response to the speed of the air flow as provided by the converter 11 controlled by the anemometer 12, so as to adapt the size of the drops of liquid to the speed of movement of the air.

Thus, the size of the charged drops of liquid and the spray flow are determined automatically so that the liquid elements are totally vaporized before having crossed the perimeter of the collection area A and the particles in suspension or the dissolved matter falls on said collection area, whence it can then be eliminated or used.

It is easy to conceive of an air flow that may be natural or artificial in origin, by using fans, for example, to create an air flow at the entrance of a tunnel, with condensation of the vapor produced at the exit.

By this means, it is possible to obtain partial or total desalinization of sea water, with recovery of a very concentrated brine on the collection area A.

It is also possible by this means to convert pulverized matter into flakes or granules of specific sizes which are deposited on a conveyor belt for movement to an area for conversion or packing.

Powdered milk may be obtained from fresh milk by using this process and this device.

This process and this device make it possible to eliminate the metallic salts dissolved in a liquid. The filtration of the air flow, at the extreme limit of the collection area, makes it possible to retain the small solid particles which, because of their small size, remain in suspension in the gaseous flow.

More generally, the quality of spectrometry obtained by the spray heads makes it possible to use them in all fields where deposits in a fine layer of controlled thickness are sought, since said heads may, depending on the flow and rotation speed, produce drops from 10 to 800 micrometers in diameter.

I claim:

1. A separation process for solid matter in suspension or in solution in a liquid, including the steps of very finely spraying drops of the suspension or solution into air in order to obtain almost instantaneous vaporization of the liquid, thus causing precipitation by gravity of the solid matter resulting from crystallization of the dissolved matter or separation of the matter in suspension, and concentrating the solid matter on a collection area, the improvement comprising:

measuring an open air flow moving across said collection area;

determining the flow of the suspension or solution and the fineness of its spray by the concentration of solid matter, pressure, temperature, hygrometry and speed of the open air flow;

regulating the size of the drops of suspension or solution for a certain drop between the spray gradient and the collection area, so that the drops of suspension or solution completely evaporate before crossing the limits of the collection area and before any fallout of the solid matter;

condensing the vaporized liquid after crossing the limits of the collection area; and charging the suspension or solution at the time of said spraying.

2. A process according to claim 1, in which the vaporized liquid is filtered before condensing.

3. A process according to claim 1, in which the liquid is recycled after condensing.

4. The process according to claim 1 applied to the treatment of waste water.

5. The process according to claim 1 applied to the conversion of milk into powder.

6. The process according to claim 1 applied to the desalinization of sea water.

7. A device for separating solid matter in suspension or in solution in a liquid, comprising:

a beam;

at least two posts supporting said beam;

a plurality of spray heads attached to said beam, each spray head having a motor;

a conduit in fluid communication with said spray heads;

a vat;

a filter in fluid communication with said conduit;

a pump for pumping fluid from said vat through said filter and conduit;

a valve in fluid communication with said conduit for discharging fluid from said conduit into said vat;

a temperature sensor and a humidity sensor for jointly controlling fluid flow in said conduit;

a collection area for collecting the solid matter; and an air flow sensor for measuring an open air flow moving across said collection area, said air flow sensor controlling said motors.

8. A device according to claim 7, wherein the collection area overhangs a conveyor belt for moving the collected solid material.

* * * * *